United States Patent [19]

Arita et al.

[11] Patent Number: 4,727,539
[45] Date of Patent: Feb. 23, 1988

[54] MULTI-ELEMENT INFORMATION TRANSMISSION SYSTEM

[75] Inventors: Setsuo Arita; Wataru Kitaura; Yuji Ichinose, all of Hitachi; Kohyu Fukunishi, Machida, all of Japan

[73] Assignee: Hitachi, Ltd., Tokyo, Japan

[21] Appl. No.: 844,321

[22] Filed: Mar. 26, 1986

[30] Foreign Application Priority Data

Mar. 27, 1985 [JP] Japan .................................. 60-63118

[51] Int. Cl.$^4$ ................................................ H04J 3/02
[52] U.S. Cl. ...................................... 370/89; 370/90; 370/96; 340/825.5
[58] Field of Search ...................... 370/89, 90, 96, 95, 370/85, 86; 340/825.5, 825.51

[56] References Cited

U.S. PATENT DOCUMENTS

| | | | |
|---|---|---|---|
| 3,633,169 | 1/1972 | Bickford | 370/90 |
| 4,340,961 | 7/1982 | Capel et al. | 370/96 |
| 4,608,685 | 8/1986 | Jain et al. | 370/96 |
| 4,653,049 | 3/1987 | Shinmyo | 370/103 |
| 4,663,756 | 5/1987 | Retterath | 340/825.5 |

Primary Examiner—Douglas W. Olms
Attorney, Agent, or Firm—Antonelli, Terry & Wands

[57] ABSTRACT

A plurality of slave stations receive a plurality of apparatus information signals concerning apparatus to be controlled (or sensors), and a master station allots the apparatus information signals to time slots in a transmission path and receives a specified apparatus information signal with priority from the respective slave stations. A priority change information signal adder in the master station adds a priority change information signal for changing priority of the information signals transmitted from each slave station to an information transmission signal string containing a sync signal and various information signals transmitted to each slave station. A multi-element information signal separator/processor in the master station separates and processes the multi-element information signals transmitted from each slave station, on the basis of the priority change information signal. A detector/counter in each slave station detects the sync signal transmitted from the master station and counts the number of time slots following the sync signal. A transmission pattern reconstructor in the slave station reconstructs transmission patterns of the respective slave stations in accordance with the priority change information signal when a count value coincides with a predetermined value.

9 Claims, 9 Drawing Figures

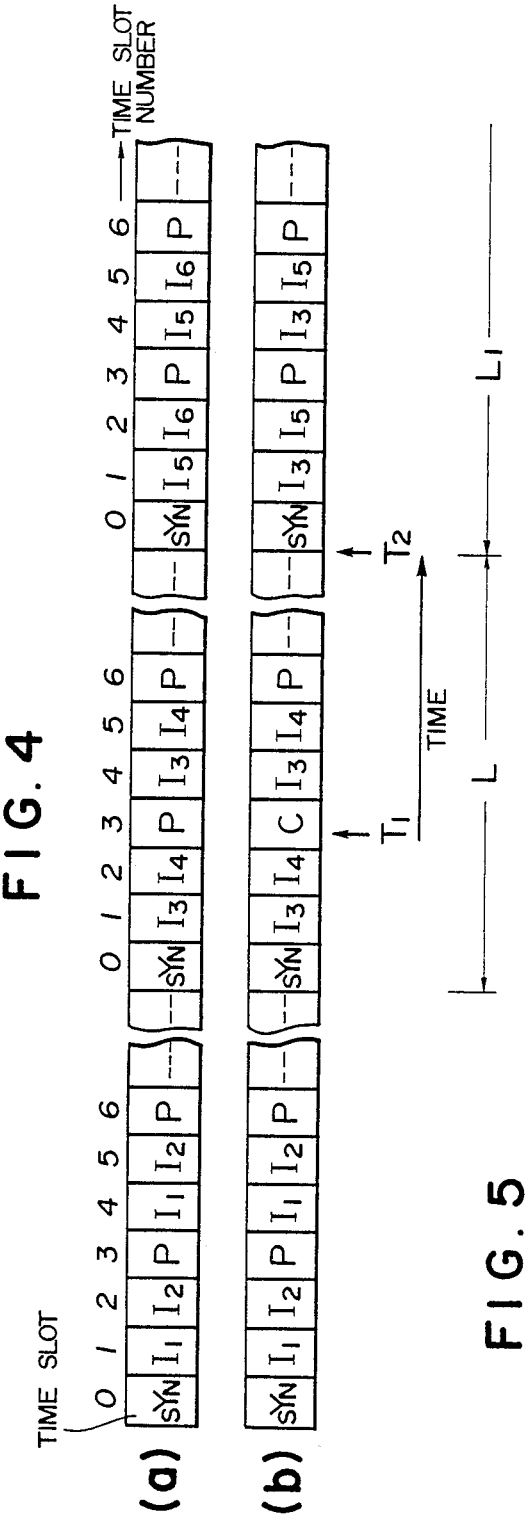
FIG. 4
FIG. 5
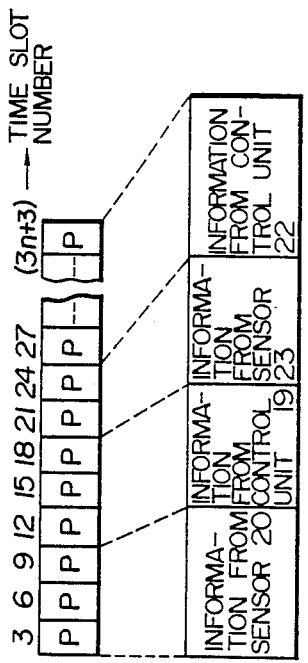
FIG. 6

MULTI-ELEMENT INFORMATION TRANSMISSION SYSTEM

BACKGROUND OF THE INVENTION

This invention relates to multi-element information transmission systems and more particularly to a multi-element information transmission system suitable for inputting a multi-element information signal string including plural kinds of information signals such as video signals of television cameras, process signals and status signals of control units and transmitting specified one and/or ones of these signals with priority.

Generally, in various plants, transmission of various kinds of signals such as video signals of television cameras, process signals and status signals of control units is needed for the purpose of promoting controlling and monitoring functions of the plants. Of these signals, some signals have a small amount of information but have response characteristics to be evaluated significantly and some have a large amount of information. Accordingly, it is desired to transmit with priority a specified piece of information as necessary. For example, JP-A-56-111345 discloses an information priority transmission system representative of a technique directed to the above transmission system for plants.

According to the system disclosed in this publication, during normal transmission, a transmission frame consisting of a sync word, a station number word and an item word is prepared in a particular station and this frame signal is transmitted to different stations. The item word herein referred to consists of various data items. During priority transmission, the particular station prepares a transmission frame consisting of a sync word, a priority transmission flag, a station number word and a priority transmission word, and this frame signal is transmitted to different stations. The priority transmission flag herein referred to indicates that a specified data is being transmitted with priority. In addition, the particular station selects the data subject to priority transmission from the item word to be transmitted during the normal transmission and reconstructs the priority transmission word by assembling the selected data in a single item word.

Thus, in this known system, the priority transmission word is prepared by the particular station and transmitted with priority during the priority transmission.

Since, in a data transmission system for use in a plant, many kinds of information are transmitted from terminals to a central controller, the respective terminals must be synchronized with each other for transmission of the information. When, in such a transmission system, a specified piece of information is transmitted with priority in the conventional manner, the priority transmission of the specified information piece (intended for shortening the transmission period of the specified information piece) will disturb the synchronization between the respective terminals, resulting in the loss of the specified information to be transmitted. If making an attempt to transmit the necessary information by using the synchronization settled during normal transmission, the information to be transmitted with priority must be added with empty slots so that the number of time slots for the priority transmission may even the number of time slots settled for the normal transmission. This prevents the preparation of a priority transmission word by the use of only the information to be transmitted with priority, thus failing to shorten the transmission period.

One may refer to other known techniques such as a data transmission system disclosed in JP-A-56-87953 and a priority transmission system disclosed in JP-A-56-111346. In these known systems, a particular terminal also prepares an information piece of its own to be transmitted with priority and transmits the information piece, with the result that the aforementioned problems are encountered. Especially, the conventional techniques have unapplicability to the data transmission in plants wherein a great amount of data from a great number of terminals are to be transmitted.

SUMMARY OF THE INVENTION

An object of this invention is to provide a multi-element information transmission system for such transmission of various signals from a plurality of slave stations to a master station as in a plant, which can transmit, as necessary, a specified signal with priority at a short period under synchronization settled between the slave stations.

According to the invention, a multi-element information transmission system is featured in that a master station transmits, as necessary, to each slave station a priority change information signal for changing priority of signal or signals transmitted from each slave station to the master station, and the respective slave station effect simultaneous reconstruction of information transmission patterns of various signals when a value resulting from counting the number of time slots in a transmission path coincides with a value of a switching command signal for designating the priority change information signal, thereby ensuring transmission of a requisite priority information signal at a short period without the loss of the information.

BRIEF DESCRIPTION OF THE DRAWINGS

FIG. 4 is a diagram useful in explaining information transmission signal strings;

FIG. 5 is a diagram for explaining a data signal (P) shown in FIG. 4;

FIG. 6 is a diagram for explaining a priority change information signal; and

DESCRIPTION OF THE PREFERRED EMBODIMENTS

The invention will now be described by way of example with reference to the accompanying drawings.

Figure 1:
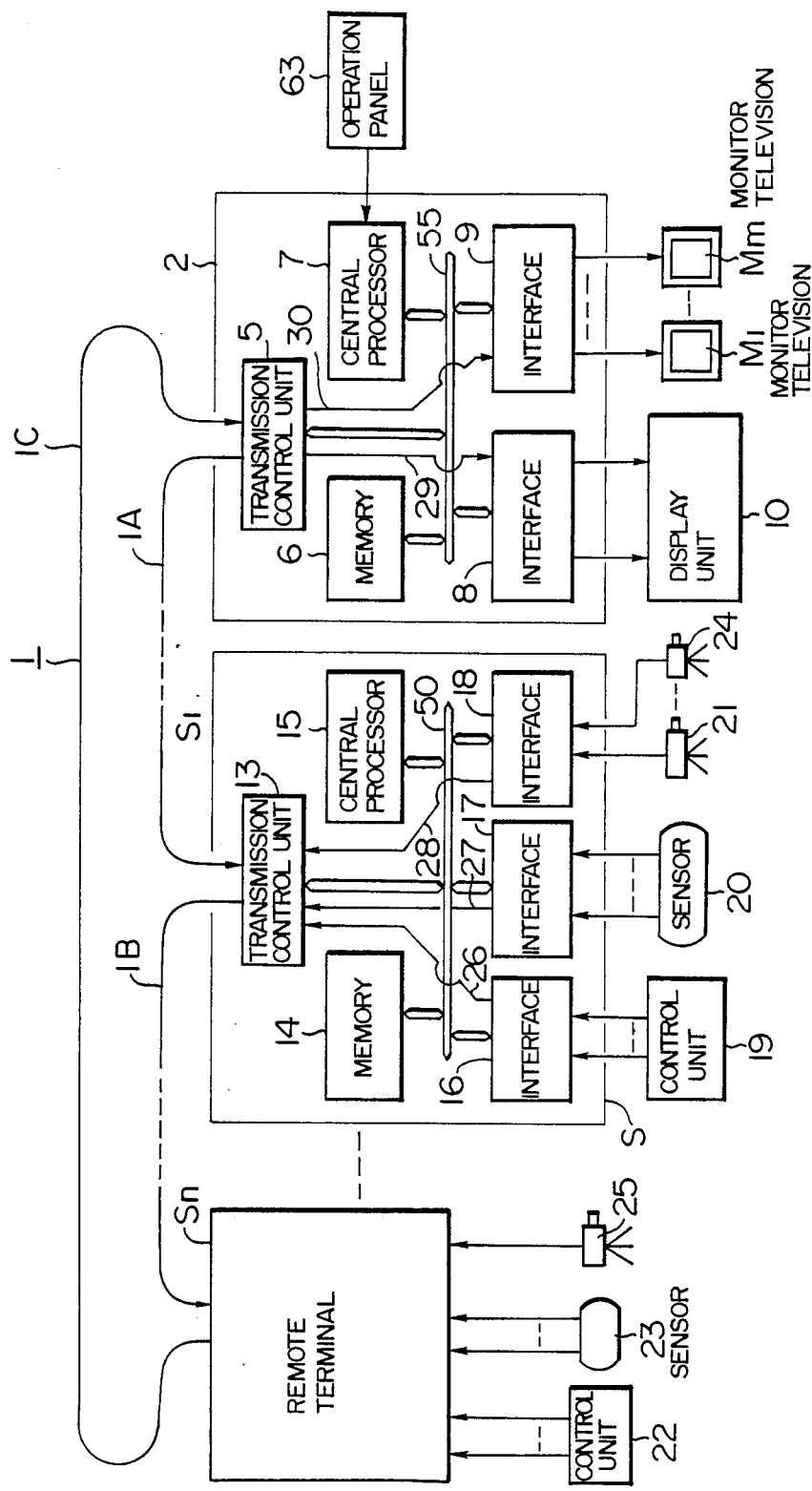
FIG. 1 is a circuit diagram showing a multi-element information transmission system according to an embodiment of the invention.

FIG. 1 shows a multi-element information transmission system according to an embodiment of the invention exemplarily constructed as a transmission system of loop type wherein a central controller serving as a master station is connected to a plurality of remote terminals $S_1$, - - -, $S_n$ serving as slave stations through a loop transmission path 1. The multi-element information transmission system is adapted for transmission of a multi-element information signal in which information signals obtained from a plurality of different information generating sources are assembled. The information signal of multi-element information is exemplified at sections (a) and (b) in FIG. 4.

Each of the remote terminals $S_1, ---, S_n$ is connected with industrial television camera or cameras (ITV cameras) for monitoring states of apparatus of a plant, sensors for measuring status parameters (temperature, pressure, flow rate and the like) of the plant, and plant apparatus control units for controlling apparatus such as for example valves, pumps and motors of the plant. The ITV cameras are designated by reference numerals 21, 24 and 25, the sensors by 20 and 23, and the plant apparatus control units by 19 and 22. The ITV cameras 21, 24 and 25 monitor apparatus to be monitored and produce video signals representative of pieces of monitoring information concerning the apparatus. The sensors 20 and 23 produce information signals representative of status parameters of controllable apparatus of the plant. Depending upon the type of system, the signals from the sensors 20 and 23 may be fetched by the control units 19 and 22, respectively.

When generally denoting the remote terminal by S, each of the remote terminals $S_1, ---, S_n$ is constructed as will be explained below by way of example of the remote terminal $S_1$.

The remote terminal S has a transmission control unit 13, a memory 14, a central processor 15, and interfaces 16 to 18. The transmission control unit 13, memory 14, central processor 15 and interfaces 16 to 18 are coupled together through a bus 50 serving as a signal transmission channel in the remote terminal S. The remote terminal S is connected to the control controller 2 by way of the transmission control unit 13 connected to the loop transmission path 1. The central processor 15 of the remote terminal S collectively controls the remote terminal S. Signals produced from the ITV cameras 21, 24 and 25 are fetched into the remote terminal S by means of the video interface 18. Signals from the sensor 20 are fetched into the remote terminal S by means of the process signal fetching interface 17. The plant apparatus control unit 19 provides a status parameter of its own which is such information on maintenance as results of self-diagnosis, and the information is fetched into the remote terminal S through the status information fetching interface 16. Pieces of the information fetched into the remote terminal S through the respective interfaces are sent to the loop transmission path 1 by means of the transmission control unit 13 controlled by the central processor 15, so as to be transmitted to the central controller 2.

Figure 2:
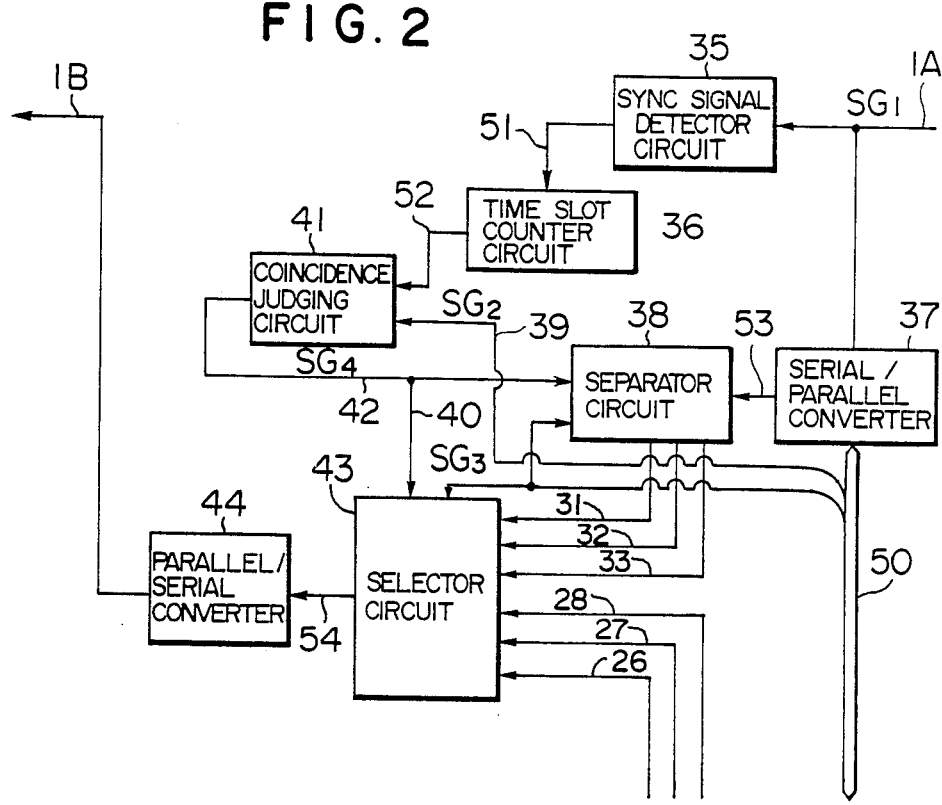
FIG. 2 is a detailed circuit diagram of a a transmission control unit (13) shown in FIG. 1.

As detailed in FIG. 2, the transmission control unit 13 has a sync signal detector circuit 35, a time slot counter circuit 36, a serial/parallel converter 37, a separator circuit 38, a coincidence judging circuit 41, a selector circuit 43, and a parallel/serial converter 44. The coincidence judging circuit 41 is adapted to decide a time for commencement of transmission of a priority information signal. A portion 1A of loop transmission path 1 on the input side of the remote terminal S is connected to the sync signal detector circuit 35. The time slot counter circuit 36 and serial/parallel converter 37 are also connected to the loop transmission path portion 1A. A portion 1B of loop transmission path 1 on the output side of the remote terminal S is connected to the parallel/serial converter 44. The output of the sync signal detector circuit 35 is connected to the time slot counter circuit 36 via a line 51. A line 52 connects the output of the time slot counter circuit 36 to the coincidence judging circuit 41. The serial/parallel converter 37 is coupled with the bus 50 and also connected to the separator circuit 38 via a line 53. A line 39 coupled with the bus 50 connects to the coincidence judging circuit 41. A line 40 coupled to the bus 50 connects to the separator circuit 38 and selector circuit 43. A line 42 connected to the output of the coincidence judging circuit 41 also connects to the separator circuit 38 and selector circuit 43. Lines 31, 32 and 33 connected to individual output terminals of the separator circuit 38 connect to the separator circuit 43. Lines 26, 27 and 28 extending from the selector circuit 43 respectively connect to the interfaces 16, 17 and 18. A line 54 connects the output of the selector circuit 43 to the input of the parallel/serial converter 44.

The central controller 2 functions to fetch and process information signals transmitted from the remote terminals $S_1, ---, S_n$ and also functions to transmit control signals inclusive of transmission control signals. However, the control signals are herein limited to transmission control signals. As shown in FIG. 1, the central controller 2 has a transmission control unit 5, a central processor 7, a memory 6, a video display interface 9, and a data transfer interface 8. A bus 55 serving as a signal transmission channel in the central controller 2 is coupled to the transmission control unit 5, central processor 7, memory 6 and interfaces 8 and 9. Video signals produced from the ITV cameras connected to the remote terminals are displayed on monitor televisions $M_1$ to $M_m$ by way of the video display interface 9. Process information signals produced from the sensors 20 and 23 and signals indicative of states of the control units 19 and 22 are outputted to a display unit 10 by way of the data transfer interface 8.

Figure 3:
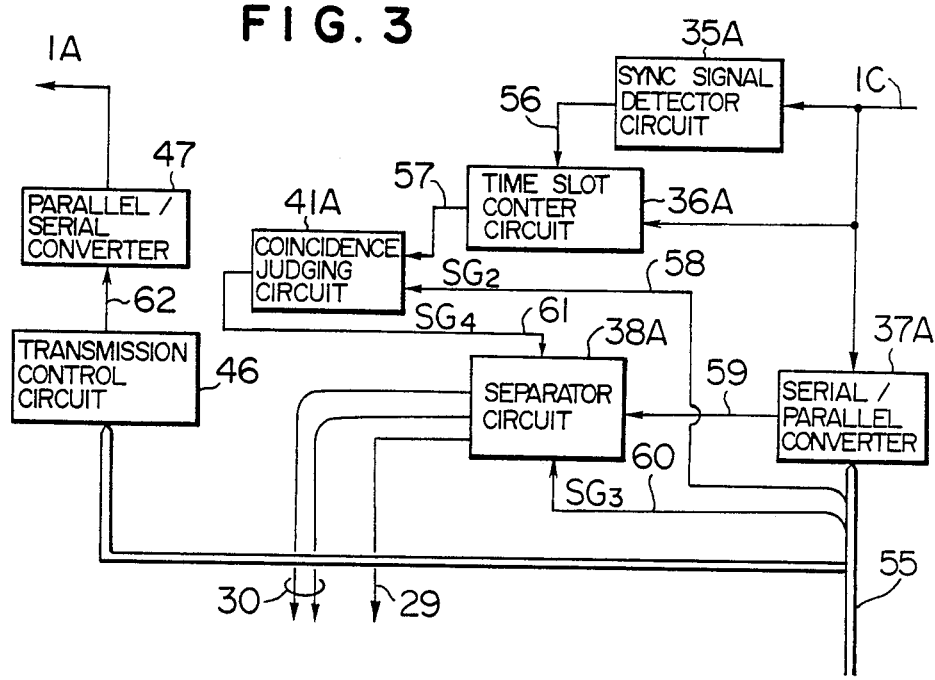
FIG. 3 is a detailed circuit diagram of a transmission control unit (5) shown in FIG. 1.

As detailed in FIG. 3, the transmission control unit 5 has a sync signal detector circuit 35A, a time slot counter circuit 36a, a serial/parallel converter 37A, a separator circuit 38A, a coincidence judging circuit 41A, a transmission control circuit 46, and a parallel/serial converter 47. The sync signal detector circuit 35A, time slot counter circuit 36A, serial/parallel converter 37A and coincidence judging circuit 41A have the same constructions as those of the sync signal detector circuit 35, time slot counter circuit 36, serial/parallel converter 37 and coincidence judging circuit 41 of the remote terminal S, and function in the same way.

A portion 1C of loop transmission path 1 on the input side of the central controller 2 is connected to the sync signal detector circuit 35A. The loop transmission path portion 1A, which is the output as viewed from the central controller 2, is connected to the parallel/serial converter 47. The loop transmission path portion 1C is also connected to the time slot counter circuit 36A and serial/parallel converter 37A. The output of the sync signal detector circuit 35A is connected to the time slot counter circuit 36A via a line 56. Respectively connected to two input terminals of the coincidence judging circuit 41A are lines 57 and 58, the former line extending from the output of the time slot counter circuit 36A and the latter line being coupled with the bus 55. The serial/parallel converter 37A is coupled to the bus 55 and also connected to one input terminal of the separator circuit 38A via a line 59. The other input terminal of the separator circuit 38A is connected to a line 60 coupled with the bus 55. A line 61 connects the output of the coincidence judging circuit 41A to the separator circuit 38A whose output terminals are connected to lines 20 and 30. As shown in FIG. 1, the line 29 connects to the data interface 8 and the line 30 connects to the video display interface 9. The transmission control circuit 46 coupled with the bus 55 is connected to the parallel/serial converter 47 via a line 62.

With the information transmission system of the above construction embodying the invention, a signal to be transmitted from the remote terminal S to the central controller 2 is changed in priority and transmitted as will be described below.

In normal operations, transmitted from the remote terminals to the central controller 2 through the loop transmission path 1 is an information signal string which contains in an orderly manner, as exemplified at section (a) in FIG. 4, video signals $I_1$ $I_2$, $I_3$, - - -, $I_i$ produced from the ITV cameras connected to the respective remote terminals S (video signals outputted from different ITV cameras are suffixed differently) and data signals P produced from the sensors and control units connected to the respective remote terminals S. In this format of the information signal string, the video signals generally designated by I are allotted to time slots which are numbered as $(3n+1)$ or $(3n+2)$ and the data signals P are allotted to time slots which are numbered as $(3n+3)$, where $n=0, 1, 2, 3$ - - -. In this embodiment, by using the time slots $(3n+1)$ and the time slots $(3n+2)$, the video signals outputted from two ITV cameras can be transmitted simultaneously in one frame. A sync signal SYN for synchronization of the information transmission signal string is exemplarily allotted to the zero-th time slot. Each bit is constituted by the same number of bits (for example, 8 bits). Signals from the sensors 20 and 23 and control units 19 and 22 constituting the data signals P are allotted to the time slots $(3n+3)$ in a manner, for example, as shown in FIG. 5. The video signal $I_1$ corresponds to an output signal from the ITV camera 21, the video signal $I_2$ to an output signal from an ITV camera not shown which is connected to the video interface 18, the video signal $I_3$ to an output signal from the ITV camera 24, and the video signal $I_4$ to an output signal from the ITV camera 25. Video signals represented by $I_5$ and I with the ensuing suffix correspond to output signals from ITV cameras, not shown, connected to the remote terminal $S_n$. It is noted that analog video signals produced from the ITV cameras are sampled at a predetermined period so as to be converted into digital video signals which are allotted to the time slots of the information transmission signal string. For example, one picture frame on screen imaged by one ITV camera is formed by all of the digital video signals allotted to the n time slots 1, 4, 7, 10, - - -, $(3n+1)$. Similarly, another picture frame imaged by another ITV camera is formed by all of the digital video signals allotted to the n time slots 2, 5, 8, 11, - - -, $(3n+2)$.

In the above transmission scheme, priority transmission of, for example, the video signal produced from the ITV camera 24 connected to the remote terminal $S_1$ is carried out as will be described below.

The central controller 2 first transmits to each of the remote terminals S an information transmission signal string in which, as shown at section (b) in FIG. 4, a priority change information signal C is assigned to, for example, the area of a time slot at time $T_1$ normally designated by the data signal P. To indicate that information contained in the time slot at time $T_1$ is the priority change information signal, a code violation code which is different from the transmission code for the other pieces of information is exemplarily used for the priority change information signal. Thus, the priority change information signal contained in the information transmission signal string transmitted from the central controller 2, more specifically, sent from the parallel/serial converter 47 of the transmission control unit 5 to the loop transmission path portion 1A can readily be identified by a remote terminal S being in receipt of this priority change information signal. In place of using the code violation code, the priority change information signal may be allotted to a preset specified time slot of the information transmission signal string or may be prepared in the form of a specified pattern, though increased in bit number, for the sake of ensuring easy identification of the priority change information signal contained in the information transmission signal string.

As shown in FIG. 6, the priority change information signal C includes pieces of information which are indicative of "an address of a remote terminal S connected to an ITV camera, sensor or plant apparatus control unit which delivers an information signal to be transmitted with priority", "the kind of the information signal to be transmitted with priority", "time slot allotment information for determining which time slot in the information transmission signal string the priority change information signal should be allotted to", "a period of the priority transmission" and "a switching command for determining an instant at which the priority transmission commences". The information of "the kind of an information signal" is adapted to designate either a plant apparatus or any of ITV camera and sensor which produces an information signal. An information signal related to the kind designated by the information "the kind of an information signal" is a priority information signal which is required to be transmitted at a short period. If the entirety of the priority change information signal shown in FIG. 6 can not be encompassed by the time slot C at time $T_1$ shown at (b) in FIG. 4, a surplus of the priority change information signal may be allotted to a time slot into which a data signal P occurring after time $T_1$ is inserted. For convenience, whether the priority change information signal is allotted to a single time slot or a plurality of time slots may be determined in advance in accordance with the type of transmission system.

While watching the display unit 10 and monitor televisions $M_1$ to $M_m$, the operator designates an apparatus of the plant (the kind of an information signal), information about which is desired to be acquainted of with priority, by manipulating an operation panel 63. The kind of an information signal thus designated is inputted to the central processor 7 of the central controller 2. The central processor 7 inputted with the kind of an information signal prepares a priority change information signal of FIG. 6 corresponding thereto and sents it to the transmission control circuit 46 via the bus 55. The central processor 7 selects information necessary for preparation of this priority change information signal from the memory 6.

Without resort to the designation inputted by the operator, the priority change information signal may automatically be prepared at the central processor 7 on the basis of an information signal outputted from a remote terminal S and contained in an information transmission signal string delivered to the central controller 2, in order that when occurrence of abnormality in the plant is decided, an information signal needed for coping with the abnormality in the plant can be transmitted with priority at a short period.

The thus inputted priority change information signal is assigned by the transmission control circuit 46 to the area of the time slot at time $T_1$ shown at (b) in FIG. 4. A parallel signal outputted from the transmission control circuit 46 contains a plurality of time slots including the priority change information signal and converted by the parallel/serial converter 47 into a one-frame information transmission signal string (L at (b) in FIG. 4) headed with the sync signal which in turn is sent to the loop transmission path portion 1A. Each one-frame information transmission signal string to be delivered out of the parallel/serial converter 47 has the same bit number (the same time slot number). Contents of the priority change information signal prepared at the central processor are stored in the memory 6.

When receiving an information transmission signal string containing a priority change information signal and delivered out of the central controller 2 as described above, each remote terminal S operates as follows. If a particular remote terminal S receives the priority change information signal designating an address of its own, the particular remote terminal transmits with priority a specified information signal of its own corresponding to "the kind of an information signal" designated by the priority change information signal (an information signal concerning a specified ITV camera, sensor or plant apparatus control unit connected to the particular remote terminal). If the particular remote terminal S receives the priority change information signal designating an address of a different remote terminal, it prevents an information signal of its own from being transmitted with priority and allows a specified information signal of the different remote terminal to be transmitted with priority.

This operation will be described below in greater detail.

It is now assumed that a priority change information signal C of an information transmission signal string $SG_1$ transmitted from the central controller 2 exemplarily has "an address of a remote terminal" indicative of "$S_1$", "the kind of an information signal" indicative of "apparatus A" and "time slot allotment information" indicative of "$(3n+1)$", and that the priority change information signal does not designate the period of the priority transmission.

Referring to FIG. 2, when the information transmission signal string $SG_1$ transmitted from the central controller 2 reaches the remote terminal $S_1$, this remote terminal first detects a sync signal contained in the information transmission signal string $SG_1$ by means of the sync signal detector circuit 35. Concurrently therewith, the serial/parallel converter 37 converts the inputted information transmission signal string $SG_1$ into a parallel signal at the rate of one time slot (8 bits). In this embodiment, one time slot is formed by 8 bits. In response to the sync signal delivered out of the sync signal detector circuit 35, the time slot counter circuit 36 starts to count the number of time slots of the information transmission signal string $SG_1$ by counting the number of bits at the rate of 8 bits. The parallel signal originating from the serial/parallel converter 37 is sent to the separator circuit 38 via line 53 and to the central processor 15 via bus 50. The central processor 15 fetches the priority change information signal C contained in the time slot having the code violation code and decodes contents shown in FIG. 6 of the priority change information signal. Specifically, the central processor 15 of the remote terminal $S_1$ judges whether "an address of a remote terminal" contained in the priority change information signal C coincides with an address of the remote terminal $S_1$. If coincident, the central processor 15 sends command signals to the interface 18 connected to the ITV camera 24 monitoring the "apparatus A" and to the interface 17 connected to the sensor 20 mounted to the "apparatus A". The interfaces 18 and 17 inputted with the command signals respectively fetch a video signal $I_3$ of the ITV camera 24 and an output signal of the sensor 20 into the remote terminal $S_1$ even after time $T_2$. Thus, the video signal $I_3$ stands for a priority information signal. From the central processor 15, a switching command signal $SG_2$ indicative of a time at which the priority transmission commences (more specifically, indicating where a time slot is located for commencement of the priority transmission when counted from the sync signal within one-frame of the information transmission signal string containing the priority change information signal) is sent to the coincidence judging circuit 41, and an information transmission pattern signal $SG_3$ indicative of what information pattern is to be transmitted is sent to the separator circuit 38 and selector circuit 43. In this embodiment, the switching command signal $SG_2$ indicates the "time $t_2$", and the information transmission pattern signal $SG_3$ indicates an information transmission pattern (for example, "$I_3$, $I_5$, P" or "$I_3$, $I_6$, P") for an information transmission signal string after the "time $T_2$", which pattern is reconstructed in consideration of the "time slot allotment information" of the priority change information signal and an information transmission pattern which has been designated before inputting the priority change information signal. The latter information transmission pattern, which has been so scheduled before inputting the priority change information signal as to be transmitted after the time $t_2$, is sent in advance from the central controller 2 to the memory 14.

When a sync signal within a transmission frame following the transmission frame, as indicated by L at (b) in FIG. 4, containing the priority change information signal C, both the transmission frames being contained in the information transmission signal string, is fetched into the remote terminal $S_1$, the coincidence judging circuit 41 generates a priority transmission commencement signal $SG_4$. In other words, the coincidence judging circuit 41 sends the priority transmission commencement signal $SG_4$ to the separator circuit 38 and selector circuit 43 when the output signal of the time slot counter circuit 36 coincides with the switching command signal $SG_2$. The separator circuit 38 and selector circuit 43 have also been applied with the information transmission pattern signal $SG_3$, as described previously. Thus, at this time, the information transmission pattern signal $SG_3$ has the video signal $I_3$ at the time slots $(3n+1)$, and the data signal P at the time slots $(3n+3)$. The separator circuit 38 responsive to the output signal of the serial/parallel converter 37 and the signals $SG_3$ and $SG_4$ produces a parallel signal consisting of the time slots $(3_{11}+1)$ on line 31, a parallel signal including the time slots $(3n+2)$ on line 32 and a parallel signal including the time slots $(3n+3)$ on line 33.

The selector circuit 43 is applied with these parallel signals via the lines 31 to 33. Output signals from the interfaces 16, 17 and 18 are also connected to the selector circuit 43 via lines 26, 27 and 28. Currently, however, the output signals of the interfaces 18 and 17 selected by the central processor 15 on the basis of the priority change information signal, especially, the video signal $I_3$ of the ITV camera 24 and the output signal of the sensor 20 are applied to the selector circuit 43. In response to the priority transmission commencement signal $SG_4$, the selector circuit 43 allots these output signal from the interfaces 18 and 17 to the parallel signals of the corresponding time slot numbers on the basis of the information transmission pattern signal $SG_3$. More particularly, the video signal $I_3$ is allotted to the parallel signal corresponding to the time slots $(3n+1)$, and the output signal (data signal) of the sensor 20 is allotted to the parallel signal corresponding to the time slots $(3n+3)$. Since there is no signal to be allotted to the parallel signal corresponding to the time slots $(3n+2)$, this parallel signal remains intact and the selector circuit 43 delivers out this parallel signal as it is. Time slot signals of the time slots $(3n+1)$, $(3n+2)$ and $(3n+3)$ delivered out of the selector circuit 43 are converted by the parallel/serial converter 44 into an information transmission signal string having each transmission frame which is headed with the sync signal SYN followed by the time slots $(3n+1)$, $(3n+2)$ and $(3n+3)$ in this order. This information transmission signal string is transferred to the remote terminal $S_2$ next to the remote terminal $S_1$.

The selection of the video signal $I_3$ produced from the ITV camera 24 continues until a different priority change information signal occurs. The other pieces of information which are not designated by the priority change information signal are cyclically selected on the basis of a command which is transmitted in advance from the central controller 2 to each remote terminal S and stored in the memory 14. If the switching at the time $T_2$ is difficult to achieve from the standpoint of hardware (for example, switching speed), switching may conveniently be completed during the period of the sync signal SYN.

Now, the operation of a remote terminal S other than the remote terminal $S_1$ will be described by way of example of the remote terminal $S_n$. Unless the priority change information signal is transmitted, the remote terminal $S_n$ will allot, as shown at (a) in FIG. 4, a video signal $I_5$ of another ITV camera and a video signal $I_6$ of a further ITV camera to time slots $(3n+1)$ and time slots $(3n+2)$ of a one-frame information transmission signal string immediately after the time $T_2$. However, the central processor 15 of the remote terminal $S_n$ decodes the priority change information signal to recognize that the video signal $I_3$ of the ITV camera 24 is allotted to the time slots $(3n+1)$ of the one-frame information transmission signal string immediately after the time $t_2$ and changes the information transmission pattern such that the video signal $I_5$ is allotted to the time slots $(3n+2)$ of the one-frame information transmission signal string immediately after the time $t_2$.

In other words, the remote terminal $S_n$, like the remote terminal $S_1$, decodes the contents of the priority change information signal C by means of the central processor 15 and prepares a new information transmission pattern signal $SG_3$ which meets the priority change information signal in consideration of the information transmission pattern after the time $t_2$ which has previously been stored in the memory 14 and "time slot allotment information" designated by the priority change information signal. The new information transmission pattern signal $SG_3$ is stored in the memory 14 of the remote terminal $S_n$. The central processor 15 of the remote terminal $S_n$ judges whether "an address of a remote terminal" designated by the priority change information signal coincides with an address of the remote terminal $S_n$. If not coincident, the central processor 15 of the remote terminal $S_n$ judges whether the newly prepared information transmission pattern signal $SG_3$ contains an information signal which is to be transmitted from the remote terminal $S_n$. If there is the information signal to be transmitted from the remote terminal $S_n$, the central processor 15 sends a command signal to an interface of the remote terminal $S_n$ which is connected to an output source of the information signal in question. Since, in this embodiment, the output source corresponds to the ITV camera 25, the interface 18 of the remote terminal $S_n$ fetches the video signal $I_5$ of the ITV camera 25 after the time $t_2$. The sync signal detector circuit 35, time slot counter circuit 36, serial/parallel converter 37, separator circuit 38 and coincidence judging circuit 41 operate in the same manner as those of the remote terminal $S_1$.

When, in the remote terminal $S_n$, a priority transmission commencement signal $SG_4$ is applied to the selector circuit 43, this selector circuit 43 responds to the information transmission pattern signal $SG_3$ to allot the output signal of that interface to a parallel signal of the corresponding time slot number. In particular, the video signal $I_5$ is allotted by the selector circuit 43 to the parallel signal corresponding to the time slots $(3n+2)$. In the absence of signals to be allotted to parallel signals corresponding to the time slots $(3n+1)$ and time slots $(3n+3)$, the selector circuit 43 of the remote terminal $S_n$ delivers out these input parallel signals as they are. The parallel/serial converter 44 of the remote terminal $S_n$ transmits onto the loop transmission path portion 1C a transmission frame, as indicated by $L_1$ at (b) in FIG. 4, of information transmission signal string which is headed with the sync signal SYN. This information transmission signal string is received by the central controller 2.

In this embodiment, the video signal $I_3$ is representative of a motion image and the video signal $I_5$ is representative of a still image.

As described above, under the application of a priority change information signal, each remote terminal S prepares a new information transmission pattern prior to the commencement of transmission of a priority information signal, on the basis of the priority change information signal and transmits the information signal based on the new information transmission pattern at the time of the commencement of transmission of the priority information signal. Accordingly, all of the remote terminals S effect substantially simultaneous (exactly simultaneous in terms of the human sense of time) reconstruction of their information transmission patterns into new ones based on the priority change information signal.

In this manner, each remote terminal S reconstructs its information transmission pattern simultaneously to transmit a specified information signal to the central controller 2 at a short period.

In connection with the above operation, the central controller 2 operates as follows. In the transmission control unit 5 of the central controller 2, the circuits 35A, 36A, 37A, 38A and 41A operate in the same manner as the corresponding circuits of the transmission control unit 13 included in the remote terminal S. In the case of central controller 2, the priority change information signal is an output information signal transmitted by itself. The central processor 7 decodes the contents of the priority change information signal stored in the memory 6 and sends the information transmission pattern signal SG$_3$ to the separator circuit 38A and the switching command signal SG$_2$ to the coincidence judging circuit 41A.

Upon coincidence of an output signal of the time slot counter circuit 36A with a switching time (time t$_2$) indicated by the switching command signal SG$_2$, the coincidence judging circuit 41A sends the priority transmission commencement signal SG$_4$ to the separator circuit 38A. In response to the priority transmission commencement signal SG$_4$, the separator circuit 38A sends the parallel signals, delivered out of the serial/parallel converter 37A and then separated time slot by time slot, to lines 29 and 30, respectively, on the basis of the information transmission pattern signal SG$_3$. A data signal P on the line 29 is displayed on the display unit 10. The video signals I$_3$ and I$_5$ on the line 30 are respectively displayed on the monitor television M$_1$ for motion image and the monitor television M$_m$ for still image.

According to this embodiment described previously, upon the commencement of priority transmission, information transmission patterns of the respective remote terminals S are switched to new ones based on a priority change information signal, so that the loss of the information necessary for monitoring or controlling can be prevented and the information can be transmitted with high efficiency. If the timing for switching is disturbed at each remote terminal S, the information to be transmitted after the switching will be lost. But, the present embodiment configured as above can be freed from such a problem, to ensure that the video signal I$_5$ for one picture frame of the ITV camera 25 adapted to produce a still image can all be transmitted. This holds true for the video signal I$_3$ of the ITV camera 24. Especially, in the event that the video signal I$_5$ is partly lost, a picture is partly lost and an imperfect picture will be displayed on the monitor television.

In the foregoing description, the time for the commencement of priority transmission is determined by inputting the switching command for the priority change information signal as desired but depending upon the type of a system used, it may be fixedly set in the central controller and each remote terminal, as will clearly be seen from the explanation given so far.

In the foregoing embodiment, the output signal from the ITV camera is exemplarily treated as the information to be transmitted with priority but the other signals may obviously be treated as such.

Figure 7:
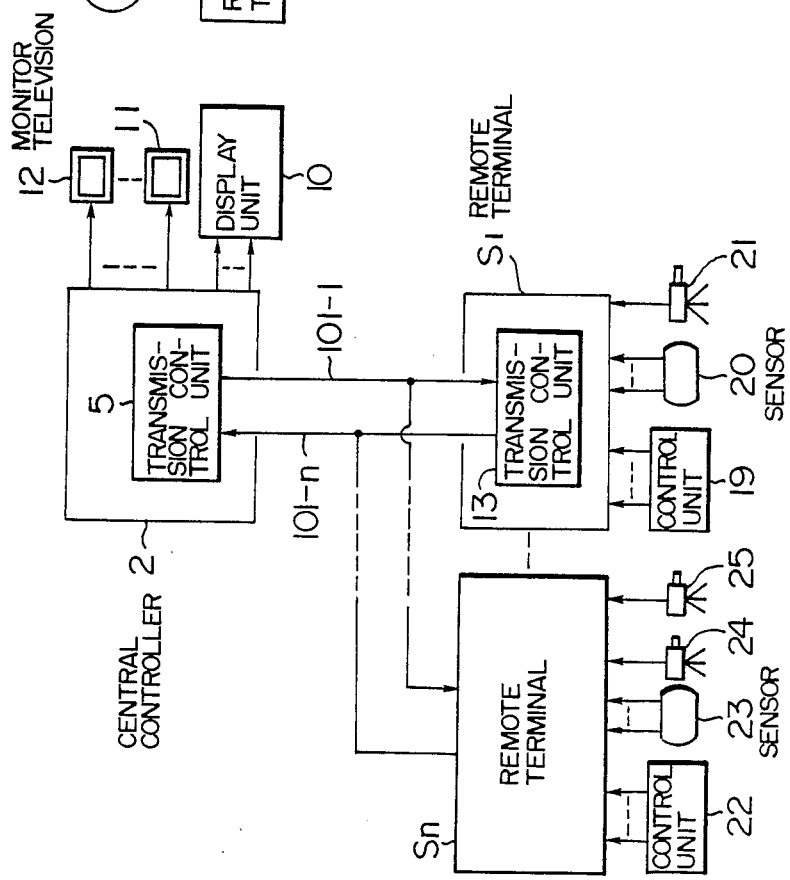

Further, the invention has been described by way of the loop type data transmission system but it may obviously be applied to a multi-drop type information transmission system as shown in FIG. 7 which employs transmission paths 101-1, —, 101-n. Reference numerals 11 and 12 denote monitor televisions.

In addition, when each remote terminal S decodes a priority change information signal transmitted from the central controller 2, necessary information may be transmitted after channel patterns of a transmission frame to be subsequently transmitted are reconstructed in accordance with the priority change information signal, as will be described in connection with the following embodiments.

Figure 8:
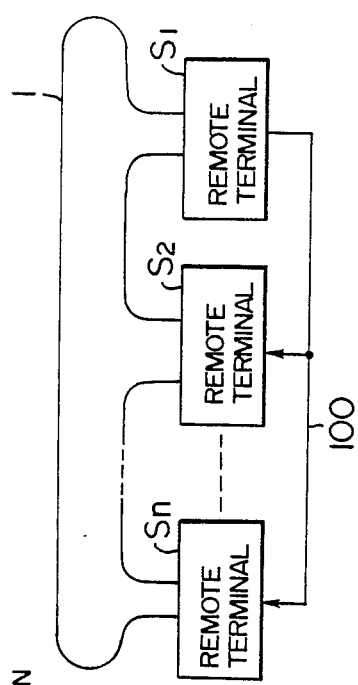
FIGS. 7 to 9 are circuit diagrams of further embodiments of the invention.
Figure 9:
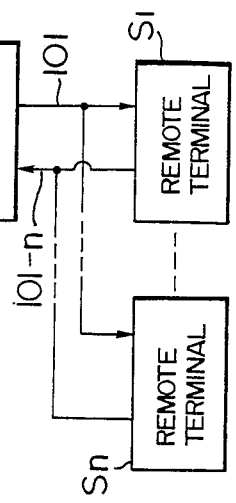

More particularly, another embodiment of the invention for this purpose as constructed in FIG. 8 is applicable to the loop type information transmission system, and still another embodiment for this purpose as constructed in FIG. 9 is applicable to the multi-drop type information transmission system. In the loop type information transmission system of FIG. 8, in addition to the transmission path 1, an exclusive signal line 100 is connected between the central controller 2 and each of the remote terminals S$_1$, S$_2$, —, S$_n$, and a command signal is transmitted from the central controller 2 to each remote terminal through the signal line 100 in order to reconstruct channel patterns of a transmission frame at the same timing and then to transmit necessary information. In FIG. 9, the aforementioned command signal is transmitted to all of the remote terminals S; especially through transmission paths 101-1, —, 101-n for transmission of signals from the central controller 2 to each of the remote terminals S$_1$, —, S$_n$, so that the respective terminals S$_1$, —, S$_n$ may reconstruct channel patterns of a transmission frame at the same timing and transmit necessary information. It will be readily understandable to use the exclusive signal line as in FIG. 8.

It should be understood from the foregoing description that in the system wherein the ITV video signals, process signals and status signals of the control units are transmitted from each slave station to the master station, the present invention ensures that specified information can be transmitted, as necessary, with priority and without the loss of the information, thereby improving monitoring and controlling functions of the plant. Moreover, the operational burden on the operator can greatly be lessened.

Therefore, the invention may be applied very advantageously to the plant or the like which has a great number of points to be monitored or controlled.

Especially, the invention may be applied with great effectiveness to a system for automatic and priority transmission of video information and sound information which are treated significantly in relation to specified criteria in, for example, a television conference.

We claim:

1. A multi-element information transmission system comprising:
   a plurality of slave stations supplied with a plurality of apparatus information signals concerning apparatus to be controlled and/or apparatus to be monitored; and
   a master station for transmitting to and receiving from each of said slave stations other information signals and said apparatus information signals;
   said master station being operable to transmit to the respective slave stations a priority change information signal which instructs each slave station to transmit a specified apparatus information signal with priority, said respective slave stations being operative to reconstruct information transmission patterns based on said priority change information signal and transmit said apparatus information signals in accordance with said reconstructed information transmission patterns.

2. A multi-element information transmission system comprising:
   a plurality of slave stations operatively inputted with a plurality of apparatus information signals concerning apparatus to be controlled and/or apparatus to be monitored; and
   a master station for allotting said apparatus information signals to selected time slots in a transmission path, said time slots being selected such that a specific one of said apparatus information signals can be received by said master station preferentially to the other apparatus information signals;
   said master station including:

means for adding a priority change information signal for changing priority of the information signals transmitted from each slave station to said master station so as to specify any one of said apparatus information signals to be received by said master station preferentially to the other apparatus information signals to an information transmission signal string to be transmitted to each slave station, said signal string containing a sync signal alloted to a time slot for synchronization of information transmission between said master station and said respective slave station and various information signals inclusive of said apparatus information signals to be transmitted from each slave station to said master station which are allotted to other time slots; and means for separating and processing the information signals transmitted from each slave station, on the basis of said priority change information signal, said respective slave stations including:

means for detecting the sync signal contained in the information transmission signal string transmitted from said master station and counting the number of time slots following the time slot alloted with the sync signal; and means for reconstructing transmission patterns of the respective slave stations in accordance with said priority change information signal when a count value from said detecting and counting means coincides with a value of a switching command designated by said priority change information signal.

3. A multi-element information transmission system according to claim 2, wherein said priority change information signal comprises information indicative of an address of a slave station designated for transmission of the specified apparatus information signal with priority, information indicative of the kind of the specified apparatus information signal to be transmitted with priority, time slot allotment information for designating which time slot is used for the priority transmission, information indicative of the period of the priority transmission, and a switching command indicative of time for commencement of the priority transmission.

4. A multi-element information transmission system according to claim 2, wherein said adding means allots the priority change information signal to a predetermined time slot.

5. A multi-element information transmission system according to claim 2, wherein said adding means allots the priority change information signal in the form of a special code to a time slot.

6. A multi-element information transmission system according to claim 5, wherein the special code is different from a code of the other information signals.

7. A multi-element information transmission system according to claim 2, wherein said separating and processing means of said master station comprises means for detecting a sync signal contained in an information transmission signal string transmitted from each slave station and counting the number of time slots following a time slot allotted with the sync signal, and means for reconstructing receiving patterns in accordance with said priority change information signal when a count value from said detecting and counting means coincides with a value of a switching command designated by said priority change information signal transmitted to each slave station, thereby processing various information signals at the rate of time slot.

8. A multi-element information transmission system according to claim 2, wherein said information transmission signal string is of a multi-element information transmission signal string.

9. A multi-element information transmission system according to claim 7, wherein said information transmission signal string is of a multi-element information signal string.

* * * * *